United States Patent [19]
Dean

[11] Patent Number: 6,111,663
[45] Date of Patent: Aug. 29, 2000

[54] APPARATUS AND METHOD FOR SELECTIVE MODEM COMMUNICATIONS ON SHARED, CLOSED-LOOP COMMUNICATION SYSTEMS

[75] Inventor: Ronald J. Dean, Clovis, Calif.

[73] Assignee: Dantel, Inc., Fresno, Calif.

[21] Appl. No.: 09/038,802

[22] Filed: Mar. 11, 1998

[51] Int. Cl.[7] .............................. H04N 1/32; H04N 1/00; H04N 1/36; H04Q 7/00; G06F 3/02

[52] U.S. Cl. .................... 358/442; 358/468; 358/406; 358/409; 710/46; 710/47; 710/48; 455/35.1; 455/15

[58] Field of Search .................................. 375/219, 220, 375/222; 455/32.1, 31.1, 35.1, 36.1; 358/406, 468, 442; 379/201, 202, 112, 207, 93.14, 93.26; 710/46, 47, 48

[56] References Cited

U.S. PATENT DOCUMENTS

| | | | |
|---|---|---|---|
| 5,065,254 | 11/1991 | Hishida | 358/400 |
| 5,189,693 | 2/1993 | Nakajima | 379/100 |
| 5,357,562 | 10/1994 | Metser et al. | 379/67 |
| 5,583,561 | 12/1996 | Baker et al. | 348/7 |
| 5,784,177 | 7/1998 | Sanchez et al. | 358/468 |
| 5,799,041 | 8/1998 | Szkopek et al. | 375/259 |
| 5,835,574 | 11/1998 | Lam | 379/90.01 |
| 5,847,844 | 12/1998 | Minamizawa | 358/442 |
| 5,878,221 | 3/1999 | Szkopek et al. | 395/200.48 |

FOREIGN PATENT DOCUMENTS

WO97/10668   3/1997   WIPO ..................... H04N 1/00

*Primary Examiner*—Edward L. Coles
*Assistant Examiner*—Coulter Henry
*Attorney, Agent, or Firm*—William S. Galliani; Pennie & Edmonds LLP

[57] ABSTRACT

A closed-loop communication system includes a closed-loop communication link with a shared communication channel. A set of communication devices are connected to the closed-loop communication link. Each communication device has un-arbitrated access to the shared communication channel. A responding modem connected to the closed-loop communication link includes a modem signal detection circuit to identify a modem signal on the closed-loop communication link and respond to it by facilitating a squelch disable signal. A transmission squelch circuit squelchs all transmission signals from the responding modem except when the transmission squelch circuit is disabled in response to the squelch disable signal.

12 Claims, 3 Drawing Sheets

APPARATUS AND METHOD FOR SELECTIVE MODEM COMMUNICATIONS ON SHARED, CLOSED-LOOP COMMUNICATION SYSTEMS

BRIEF DESCRIPTION OF THE INVENTION

This invention relates generally to closed-loop communication links with a shared communication channel. More particularly, this invention relates to a technique of selective modem communications on a closed-loop communication link that minimizes disruption with other communication devices using the shared communication channel.

BACKGROUND OF THE INVENTION

Closed-loop communication systems have a closed-loop communication link that provides a shared communication channel. A set of communication devices are connected to the closed-loop communication link. Each communication device has un-arbitrated access to the shared communication channel. For example, a facsimile machine, a telephone, and a modem may be connected to a wire that forms a loop throughout a company. The facsimile machine, telephone, and modem each have un-arbitrated access to the wire. Therefore, if the modem is applying modem data to the wire and an individual picks up the telephone, then the voice data will disrupt the modem data and the modem data will disrupt the voice data.

Prior art modems can be broadly classified into two types: (1) 2400 bits per second or less devices, referred to as slow modems, and (2) greater than 2400 bits per second devices, referred to as fast modems. Slow modems may observe an on-demand protocol wherein if there is modem data to transmit, the modem immediately seizes control of the communication link and transmits the modem data to the communication link until there is no longer data to transmit. Fast modems observe a continuous handshake protocol wherein the transmitting modem continuously sends handshake signals to which a receiving modem is to reply. The handshake signals are sent even if a reply is not received. If a reply is received, the two modems communicate with each other.

The slow modem of the prior art presents problems on closed-loop communication links because it automatically seizes control of a closed-loop communication link, even if the receiving modem is not operative. As a result, modem data may unnecessarily disrupt communications on the shared communication channel. Also, slow modems, by definition, can only communicate at 2400 bits per second or less. If faster data rates are desired, slow modems cannot meet the need.

The fast modem of the prior art presents a problem on closed-loop communication links because it continuously sends handshake signals or data. Thus, the fast modem also has the shortcoming of unnecessarily disrupting communications on the shared communication channel.

In view of the foregoing, it would be highly desirable to improve the operation of shared, closed-loop communication links such that the disruption caused by the operation of modems is minimized.

SUMMARY OF THE INVENTION

The apparatus of the invention includes a closed-loop communication link with a shared communication channel. A set of communication devices are connected to the closed-loop communication link. Each communication device has un-arbitrated access to the shared communication channel. A responding modem connected to the closed-loop communication link includes a modem signal detection circuit to identify a modem signal on the closed-loop communication link and respond to it by facilitating a squelch disable signal. A transmission squelch circuit squelches all transmission signals from the responding modem except when the transmission squelch circuit is disabled in response to the squelch disable signal.

The method of the invention includes the step of sending, with an initiating modem, a transmission request onto a closed-loop communication link. Transmission signals from the initiating modem are squelched if handshake data is not received in response to the initiation request from a responding modem. In this way, the initiating modem only operates if the responding modem is operative. Therefore, modem communications on the shared communication channel are minimally disruptive to communications between other communication devices connected to the closed-loop communication link.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
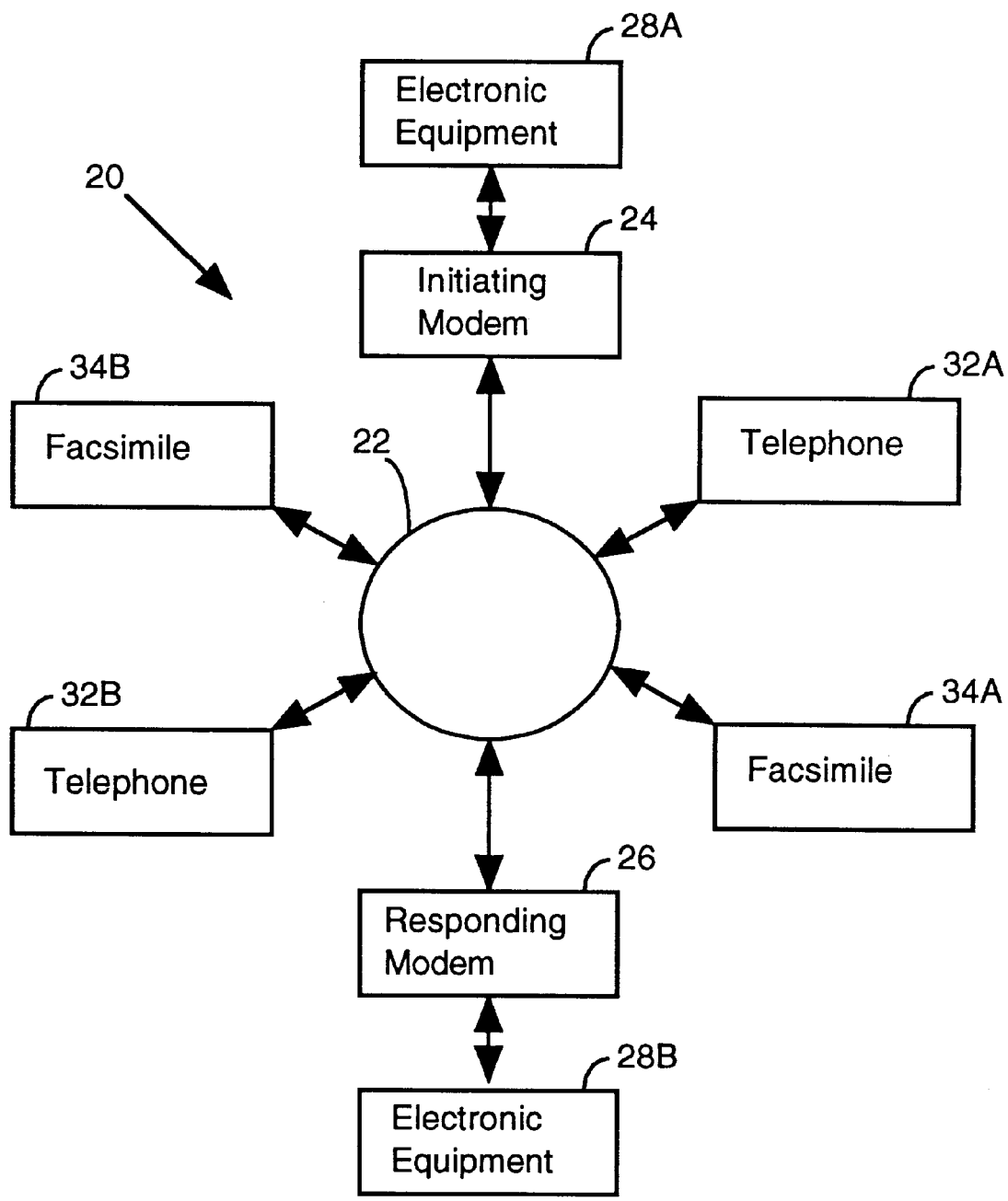
FIG. 1 illustrates a closed-loop communication system incorporating the technology of the present invention.

FIG. 1 illustrates a closed-loop communication system 20 in accordance with the invention. The system 20 includes a shared communication channel 22 in the form of a closed-loop. The communication channel may be a wire, fiber optic link, or equivalent devices. A number of communication devices are connected to the shared communication channel 22. FIG. 1 illustrates an initiating modem 24 and a responding modem 26 connected to the shared communication channel 22. Each modem is connected to electronic equipment 28A, 28B. By way of example, the electronic equipment may be a computer, an alarm system, an electronic monitoring device, or the like.

FIG. 1 further illustrates a set of telephones 32A, 32B connected to the communication link 22. In addition, facsimile machines 34A, 34B are connected to the communication link 22. The communication link includes a communication channel that is shared by all of the communication devices 24–34 connected to the communication link 22. Each communication device has un-arbitrated access to the communication link 22. In other words, each communication device can access the communication link 22 at any time, even if another communication device is accessing the communication link 22 at the same time. This scenario can result in interference between voice and data signals. The present invention is directed toward minimizing such occurrences.

Figure 2:
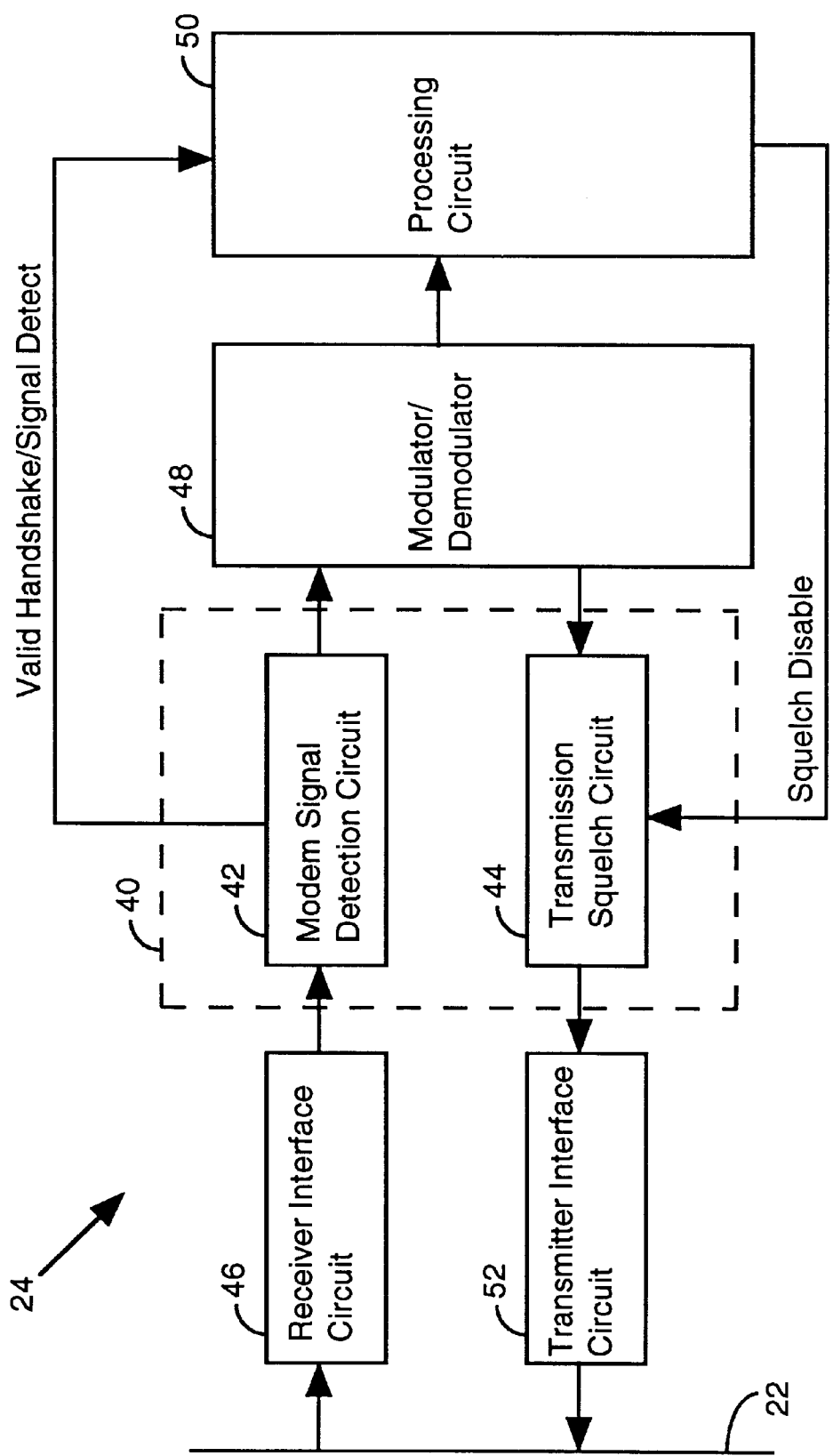
FIG. 2 illustrates a modem constructed in accordance with an embodiment of the invention.

FIG. 2 illustrates a modem 24 constructed in accordance with an embodiment of the invention. The modem 24 includes a modem squelch control circuit 40 constructed in accordance with an embodiment of the invention. The modem squelch control circuit 40 includes a modem signal detection circuit 42, which operates to identify a modem signal present on the communication link 22. In the presence of such a signal, the modem signal detection circuit 42 generates a valid handshake or signal detect signal, which is applied to the processing circuit 50. The processing circuit 50 generates a squelch disable signal, which is applied to a transmission squelch circuit 44. The transmission squelch circuit 44 normally squelches all outgoing transmission signals from the modem. Thus, the transmission squelch circuit 44 operates to minimize data on the communication link 22. However, in the presence of a modem signal, as identified by the modem signal detection circuit 42, the squelch disable signal allows the transmission squelch circuit 44 to pass transmission signals so that a communication handshake can be accomplished between modems.

The modem squelch control circuit 40 of the invention may be utilized with other standard modem components. For example, FIG. 2 illustrates a standard receiver interface circuit 46 connected to the communication link 22. The received signal from the receiver interface circuit 46 is applied to the modem signal detection circuit 42, which processes the signal in the manner described above. A detected modem signal is then passed to a modulator/demodulator 48 and a processing circuit 50 for processing in accordance with known modem processing techniques.

The processing circuit 50 may be a prior art processing circuit, with the exception that such a circuit is modified to include a circuit to generate a squelch disable signal when the modem 24 intends to dispatch a discrete transmission request. In other words, instead of continuously dispatching a transmission request, as done with prior art fast modems, the modems of the invention are modified to include a transmission squelch circuit 44 that only transmits data when it is disabled. The processing circuit 50 will temporarily disable the transmission squelch circuit 44 when it is desired to send modem data. If a handshake acknowledgment is received at the modem signal detection circuit 42, the squelch disable signal is again applied to the transmission squelch circuit 44 so that the modem data may be transmitted. A standard transmitter interface circuit 52 is used to establish a connection to the communication link 22.

The modem signal detection circuit 42 has been implemented using a Rockwell RC144DPI Modem Data Pump chip, sold by Rockwell International. In particular, the chip is programmed to recognize a modem handshake signal and/or modem data. In response to such data, a valid handshake/signal detect signal is applied to the processing circuit 50. The processing circuit 50 then produces a squelch disable signal which is applied to the transmission squelch circuit 44. The function of the transmission squelch circuit 44 may be programmed into the Rockwell RC144DPI Modem Data Pump chip. Those skilled in the art will recognize that there are many other ways to implement the same functionality associated with the invention.

In the absence of a modem handshake signal or modem data, the squelch disable signal is eliminated, resulting in the squelching of all transmission data. The transmission squelch circuit 44 may be implemented as an enabled switch. That is, the circuit 44 may be implemented as a simple closed switch which is only opened in response to a control signal (the squelch disable signal).

Figure 3:
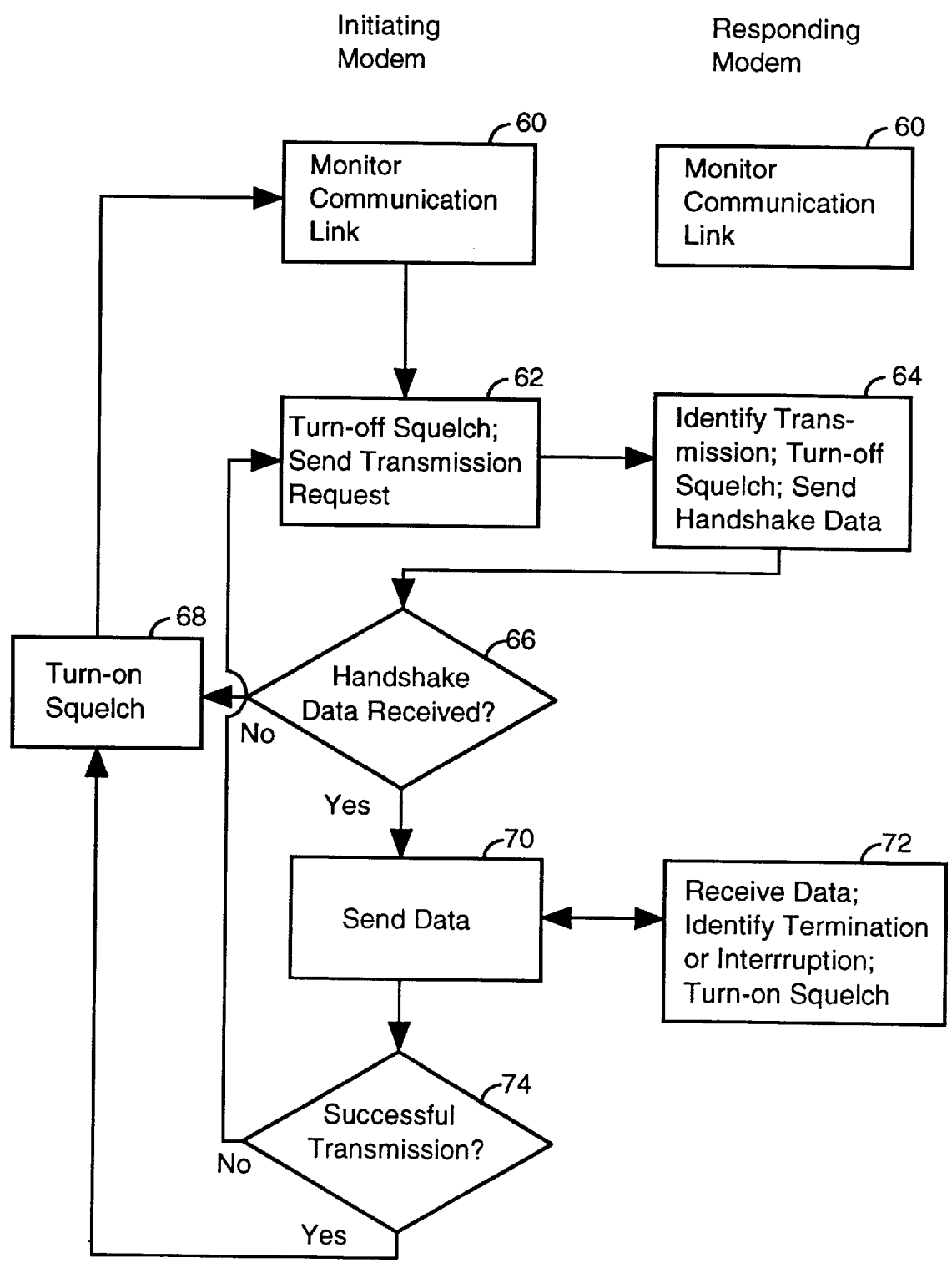
FIG. 3 illustrates the processing steps associated with a modem constructed in accordance with an embodiment of the invention.

The operation of the invention is more fully appreciated with reference to FIG. 3. FIG. 3 illustrates the processing operations performed by an initiating modem 24 and a responding modem 26. Each modem 24, 26 operates in a stand-by state wherein it monitors communications on the communication link 22 (step 60). In particular, the modem signal detection circuit 42 processes all signals on the communication link 22 to identify a modem handshake signal or a modem data signal. In the presence of such a signal, the modem signal detection circuit 42 generates a valid handshake/signal detect signal, which is applied to the processing circuit 50. This results in a squelch disable signal being applied to the transmission squelch circuit 44. The transmission squelch circuit 44 also receives a squelch disable signal from the processing circuit 50 when an initiating modem intends to launch data. Thus, as shown in FIG. 3, the next processing step is for the initiating modem 24 to turn-off the squelch circuit 44 and send a transmission request (step 62). That is, in the case of an initiating modem 24, communication is initiated when the processing circuit 50 generates a squelch disable signal that allows the transmission of a communication request through the transmission squelch circuit 44.

The communication request is routed on the communication link 22 where it is identified by the modem signal detection circuit 42 of the responding modem. Thus, as shown in FIG. 3, the next processing step is to identify the communication request, turn-off the squelch circuit, and send handshake data (step 64). That is, the communication request is identified at the modem signal detection circuit 42, which generates a responsive squelch disable signal, which is applied to the transmission squelch circuit 44. Standard handshake data may then be passed through the transmission squelch circuit 44. The handshake data is then routed along the communication link 22.

The initiating modem 24 waits to receive the handshake data (step 66). If the handshake data is not received, then the transmission squelch circuit 44 is turned-on once again (step 68). Observe here that instead of continuously initiating the transmission request, as would be done in a prior art fast modem, the output of the initiating modem is squelched, thereby reducing disruptive traffic on the communication link 22. Further observe that unlike prior art slow modems which automatically transmit modem data, the operation of the present invention only transmits modem data if the target modem is operative. Therefore, disruptive traffic on the communication link 22 is reduced.

If the handshake data is received, then the modem data is sent (step 70). The transmitted data is received at the responding modem (step 72). As previously indicated, the modem signal detection circuit 42 identifies transmission requests and modem data. In the absence of these signals, for example when the transmission is completed or interrupted, the squelch disable signal is eliminated, thereby turning-on the squelch circuit 44.

The final processing step shown in FIG. 3 is for the initiating modem 24 to determine whether the transmission of modem data was successful (step 74). Prior art techniques may be used to assess whether data was transmitted successfully. If the data was not successfully transmitted, then control returns to processing step 62, which results in the re-sending of the transmission request. If the data was successfully transmitted, the control returns to step (68), which results in the transmission squelch circuit being turned back on, thereby blocking disruptive noise on the communication link 22.

Those skilled in the art will recognize a number of benefits associated with the invention. The invention reduces noise on a shared, closed-loop communication link. In the absence of the invention, a prior art slow modem would always launch its data onto the communication link. In accordance with the invention, the modem data will only be launched if the target modem is operative, as indicated with a handshake signal. A prior art fast modem would continuously launch transmission requests. The present invention eliminates this practice by disabling such requests if an acknowledgment is not received. This technique reduces traffic on the communication link. As a result, telephone, facsimile, or other modulated data is less likely to be disrupted.

Advantageously, the invention may be readily incorporated into existing and future modem designs. All that is required is the addition of the highly compatible modem squelch control circuit 40.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

In the claims:

1. A closed-loop communication system, comprising:
   a closed-loop communication link with a shared communication channel;
   a plurality of communication devices connected to said closed-loop communication link, each communication device of said plurality of communication devices having un-arbitrated access to said shared communication channel, said shared communication channel experiencing signal interference when two or more communication devices of said plurality of communication devices simultaneously access said closed-loop communication link; and
   a responding modem connected to said closed-loop communication link, said responding modem including
      a modem signal detection circuit to identify a modem signal on said closed-loop communication link and in response thereto facilitate a squelch disable signal, and
      a transmission squelch circuit to squelch all transmission signals from said responding modem except when said transmission squelch circuit is disabled in response to said squelch disable signal, said transmission squelch circuit thereby operating to minimize signal traffic on said closed-loop communication link.

2. The apparatus of claim 1 wherein said plurality of communication devices include communication devices selected from the group including: a modem, a telephone, and a facsimile machine.

3. The apparatus of claim 2 wherein said plurality of communication devices include an initiating modem to generate said modem signal, said initiating modem including
   an initiating modem signal detection circuit to identify a modem signal from said responding modem and in response thereto facilitate an initiating modem squelch disable signal, and
   an initiating modem transmission squelch circuit to squelch all transmission signals from said initiating modem except when said initiating modem transmission squelch circuit is disabled in response to said initiating modem squelch disable signal, said initiating modem transmission squelch circuit thereby operating to minimize signal traffic on said closed-loop communication link.

4. The apparatus of claim 1 further comprising a processing circuit connected to said modem signal detection circuit to generate said squelch disable signal.

5. The apparatus of claim 4 wherein said processing circuit generates said squelch disable signal to initiate a discrete transmission request.

6. The apparatus of claim 4 wherein said processing circuit generates a squelch enable signal when said modem signal is terminated or interrupted.

7. A modem for use in a closed-loop communication system, comprising:
   a communication node for connection to a closed-loop communication link with a shared communication channel that experiences signal interference when two or more communication devices connected to said shared communication channel simultaneously access said closed-loop communication link;
   a modem signal detection circuit to identify a modem signal on said closed-loop communication link and in response thereto facilitate a squelch disable signal; and
   a transmission squelch circuit to squelch all transmission signals except when said transmission squelch circuit is disabled in response to said squelch disable signal, said transmission squelch circuit thereby operating to minimize signal traffic on said closed-loop communication link.

8. The apparatus of claim 7 further comprising a processing circuit connected to said modem signal detection circuit to generate said squelch disable signal.

9. The apparatus of claim 8 wherein said processing circuit generates said squelch disable signal to initiate a discrete transmission request.

10. A method of selective modem communication on a closed-loop communication system, said method comprising the steps of:
    sending, with an initiating modem, a transmission request onto a closed-loop communication link; and
    squelching transmission signals from said initiating modem if handshake data is not received in response to said sending step.

11. The method of claim 10 further comprising the steps of:
    identifying said transmission request with a responding modem connected to said closed-loop communication link;
    routing handshake data from said responding modem to said initiating modem in response to said identifying step; and
    transmitting a modem data block from said transmitting modem to said responding modem in response to said routing step.

12. The method of claim 11 further comprising the step of squelching transmission signals from said initiating modem and said responding modem when said modem data block is transmitted or interrupted.

* * * * *